US012618536B2

(12) United States Patent
Jekosch et al.

(10) Patent No.: US 12,618,536 B2
(45) Date of Patent: May 5, 2026

(54) HOUSING MODULE FOR A LIGHTING ELEMENT

(71) Applicant: HELLA GMBH & CO. KGAA, Lippstadt (DE)

(72) Inventors: Britta Jekosch, Lippstadt (DE); Ralf Seiger, Lippstadt (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 0 days.

(21) Appl. No.: 19/233,651

(22) Filed: Jun. 10, 2025

(65) Prior Publication Data

US 2025/0297715 A1 Sep. 25, 2025

Related U.S. Application Data

(63) Continuation of application No. PCT/EP2022/086901, filed on Dec. 20, 2022.

(51) Int. Cl.
| *F21S 41/19* | (2018.01) |
| *B60Q 1/04* | (2006.01) |
| *F21S 43/19* | (2018.01) |

(52) U.S. Cl.
CPC .............. *F21S 41/192* (2018.01); *B60Q 1/04* (2013.01); *F21S 43/195* (2018.01)

(58) Field of Classification Search
CPC ........ F21S 41/192; F21S 43/195; B60Q 1/04; B60Q 1/0088; F16B 2/08; F16B 21/086;
(Continued)

(56) References Cited

U.S. PATENT DOCUMENTS

| 10,823,353 B1 * | 11/2020 | Battaglia | ................. F21S 41/30 |
| 2016/0047494 A1 * | 2/2016 | Dickinson | ............. F16G 11/143 |
| | | | 248/74.1 |

(Continued)

FOREIGN PATENT DOCUMENTS

| CN | 102291953 A | * | 12/2011 | ........... H05K 7/1489 |
| CN | 108909653 A | | 11/2018 | |

(Continued)

OTHER PUBLICATIONS

The International Search Report of the International Searching Authority for Application No. PCT/EP2022/086901, mailed Jul. 26, 2023 (3 pages).

*Primary Examiner* — Thien M Le
*Assistant Examiner* — Tae W Kim
(74) *Attorney, Agent, or Firm* — WARNER NORCROSS + JUDD LLP

(57) ABSTRACT

The invention disclosed herein relates to a housing module for a lighting element for a vehicle. The housing module includes a base body, a fastening interface provided on the base body for fastening the housing module to a lighting element, and a receptacle provided on the base body for arranging a cable holder. The receptacle includes an opening and a plurality of sliding elements partially surrounding the opening, wherein the sliding elements are arranged on a first side of a surface of the base body comprising the opening. The sliding elements are configured to urge a plurality of flexible latching elements of the cable holder projecting from a second side opposite the first side through the surface onto the first side from a locking position to a release position when the cable holder rotates in the opening.

8 Claims, 5 Drawing Sheets

(58) Field of Classification Search
CPC . F16B 2005/0671; F16B 21/02; F16L 3/2431;
B60R 16/0215; Y10T 403/7005
USPC ......................................... 362/546; 403/348
See application file for complete search history.

(56) References Cited

U.S. PATENT DOCUMENTS

2020/0109725 A1    4/2020  Shen et al.
2022/0170497 A1*   6/2022  Covo ...................... F16B 21/02

FOREIGN PATENT DOCUMENTS

FR          3121194 A1    9/2022
KR           132833 Y1    10/1999

* cited by examiner

HOUSING MODULE FOR A LIGHTING ELEMENT

CROSS-REFERENCE TO RELATED APPLICATIONS

The present application is a continuation of International Application No. PCT/EP2022/086901, filed Dec. 20, 2022, the disclosures of which is incorporated by reference.

FIELD OF THE INVENTION

The present invention relates to a housing module for a lighting element of a vehicle, a lighting element for a vehicle, a vehicle and a method for arranging a component on a lighting element.

BACKGROUND OF THE INVENTION

Lighting elements for vehicles, such as headlights or taillights, are complex components with a large number of components that are accommodated in a very limited installation space.

Particularly in the case of lighting elements with a movement function for illuminating curves, for example, or for adapting to a particular vehicle position, it is necessary for cables arranged in a lighting element to be secured in their position so that jamming of a cable during movement of a component of the lighting element is avoided.

Cable holders are generally used to secure the respective cables in a fixed position in a lighting element. However, fixed cable holders lead to the problem that components on which a cable holder is arranged can no longer be removed. This can lead to the situation where in the event of a failure of a light source, the complete lighting element must be repaired either in a complex process by a technician or be replaced completely.

SUMMARY OF THE INVENTION

Against this background, it is a problem underlying the invention disclosed herein to provide a possibility for replacing components of a lighting element with position-fixed cables, which can also be carried out by a non-technically trained user.

In order to solve the aforementioned problem, according to a first aspect of the invention disclosed herein, a housing module for a lighting element for a vehicle is disclosed.

The housing module disclosed herein comprises a base body, a fastening interface provided on the base body for fastening the housing module to a lighting element, and a receptacle provided on the base body for arranging a cable holder.

The receptacle comprises an opening and a number of sliding elements partially surrounding the opening, wherein the number of sliding elements are arranged on a first side of a surface of the base body comprising the opening, wherein the plurality of sliding elements are configured to urge a plurality of flexible latching elements of the cable holder projecting from a second side opposite the first side through the surface onto the first side from a locking position to a release position when the cable holder rotates in the opening, wherein the plurality of latching elements overlie the surface by an undercut and thereby conditionally secure the cable holder to the housing module in the locked position, and the plurality of latching elements are compressed so as to be movable through the opening to release the cable holder from the housing module in the release position.

In the context of the presented invention, a "cable holder" means an element for securing a cable in a fixed position. In particular, a cable holder comprises a cable fixing means and a latching means comprising a number of latching elements.

By a number of elements is meant in the context of the presented housing module at least one element, i.e., a single element or a plurality of elements.

The invention disclosed herein is based on the principle that a receptacle is provided on a housing module on which a cable holder can be arranged or into which a cable holder can be inserted. For this purpose, the receptacle comprises an opening and a number of sliding elements. Preferably, two sliding elements can surround an opening, for example.

The sliding elements serve to move, i.e., compress, latching elements of the cable holder when the cable holder is rotated from its locking position to its release position.

According to an embodiment, respective sliding elements of the plurality of sliding elements are spaced apart from each other so that the plurality of latching elements engage respective abutment surfaces formed between the respective sliding elements when the cable holder is in the locked position.

In order to release or decompress latching elements of the cable holder when the cable holder is rotated from its release position to its locking position, respective sliding elements may be spaced apart from each other so as to form abutment surfaces on which latching elements urging outwardly between the sliding elements abut or engage in an undercut.

According to another embodiment, the number of sliding elements continuously surrounds the opening, with the exception of the contact surfaces formed between the respective sliding elements.

Sliding elements bordering the opening, i.e., sliding elements arranged at an edge of the opening and aligned with the opening, for example, force the latching elements into the opening when the cable holder moves from the locked position to the released position.

For example, respective sliding elements can border the opening in certain areas, i.e., be provided only on a part of the edge of the opening.

Furthermore, respective sliding elements may border the opening with only a particular area of the respective sliding element, such that the sliding element comprises a first area arranged at the edge of the opening and a further area spaced apart from the edge of the opening. In this respect, the further region may, for example, form a receptacle for a latching element that, in the locking position, overlies the surface on which the opening is arranged so that the latching element is compressed by the further region along a predetermined trajectory when the corresponding cable holder is moved into the release position. Accordingly, the further area enables harmonious compression of the latching element and prevents damage to the cable holder due to jerky compression of the latching element.

According to another embodiment, respective sliding elements of the plurality of sliding elements are arranged opposite to each other so as to urge respective latching elements of the plurality of latching elements jointly and simultaneously into the release position when the cable holder is rotated from the locked position by the plurality of sliding elements.

Through the cooperation of a plurality of sliding elements, respective sliding elements may be moved towards each other and compressed accordingly.

According to another embodiment, when the cable car is rotated, respective sliding elements of the plurality of sliding elements are bent towards each other to urge respective latching elements of the plurality of latching elements from the locked position to the release position on a trajectory predetermined by the plurality of sliding elements.

By bending respective sliding elements towards each other or towards the respective opening, a movement of respective latching elements towards the opening is achieved when a corresponding cable holder is rotated from the locking position to the release position.

Furthermore, a trajectory specified by the respective sliding elements enables blind operation, i.e., movement of the cable holder between the release position and the locked position without visual control by a user, since the sliding elements automatically push the latching elements of the cable holder into the corresponding position.

In this context, the respective sliding elements may comprise, for example, a straight part and a curved part, in particular a part curved in a quarter circle.

According to another embodiment, respective sliding elements of the number of sliding elements form at least partially an edge surface of the opening.

Sliding elements forming an edge surface of the opening, i.e., aligning with the opening or merging flatly into the opening, cause a respective cable holder to slide out of a respective opening harmoniously or with little effort when the cable holder is rotated into the release position. In particular, sliding elements forming an edge surface of the opening urge latching elements of the cable holder into the opening or along the edge of the opening and through the opening.

According to another embodiment, a space for moving is formed on the second side, in which the cable holder is rotatable between the locking position and the release position.

In order to move the cable holder between the locking position and the release position, a free space, i.e., a space in which no obstacles oppose a movement of the cable holder, on the second side is advantageous.

According to a second aspect, the invention disclosed herein relates to a lighting element for a vehicle.

The lighting element disclosed herein, such as a headlight or a rear light, comprises a number of possible embodiments of the housing module disclosed herein and a number of cable holders for arranging in the opening of the base body of a respective housing module.

By means of respective housing modules, an interior region of the lighting element disclosed herein can be easily and quickly opened or made accessible to a user, despite cables being secured in position via respective cable holders. For example, a user can move a cable holder on a housing module from its locking position to its release position, release the cable holder from the housing module, release the housing module from the lighting element or a housing body of the lighting element, and replace a light source protected by the housing module. Subsequently, the housing module can be arranged on the housing body again, and the cable holder can be secured to the housing module by inserting the latching elements of the cable holder into an opening of the housing module and moving the cable holder into its locking position.

According to a third aspect, the invention disclosed herein relates to a vehicle comprising a number of possible embodiments of the lighting element disclosed herein.

According to a fourth aspect, the invention disclosed herein relates to a method for arranging a component on a possible embodiment of the lighting element disclosed herein.

The method disclosed herein comprises rotating the cable holder from the locking position to the release position, releasing the cable holder from the housing module, releasing the housing module from the lighting element to gain access to an installation location, arranging the component at the installation location, placing the housing module on the lighting element and over the installation location, connecting the cable holder to the housing module in the cable holder release position, and rotating the cable holder from the release position to the lock position to lock the cable holder to the housing module.

In particular, the method disclosed herein serves to replace a light source of a headlamp.

BRIEF DESCRIPTION OF THE DRAWING

The invention disclosed herein is explained in more detail below with reference to the accompanying drawings. It is shown.

DETAILED DESCRIPTION OF THE CURRENT EMBODIMENT

Figure 1:
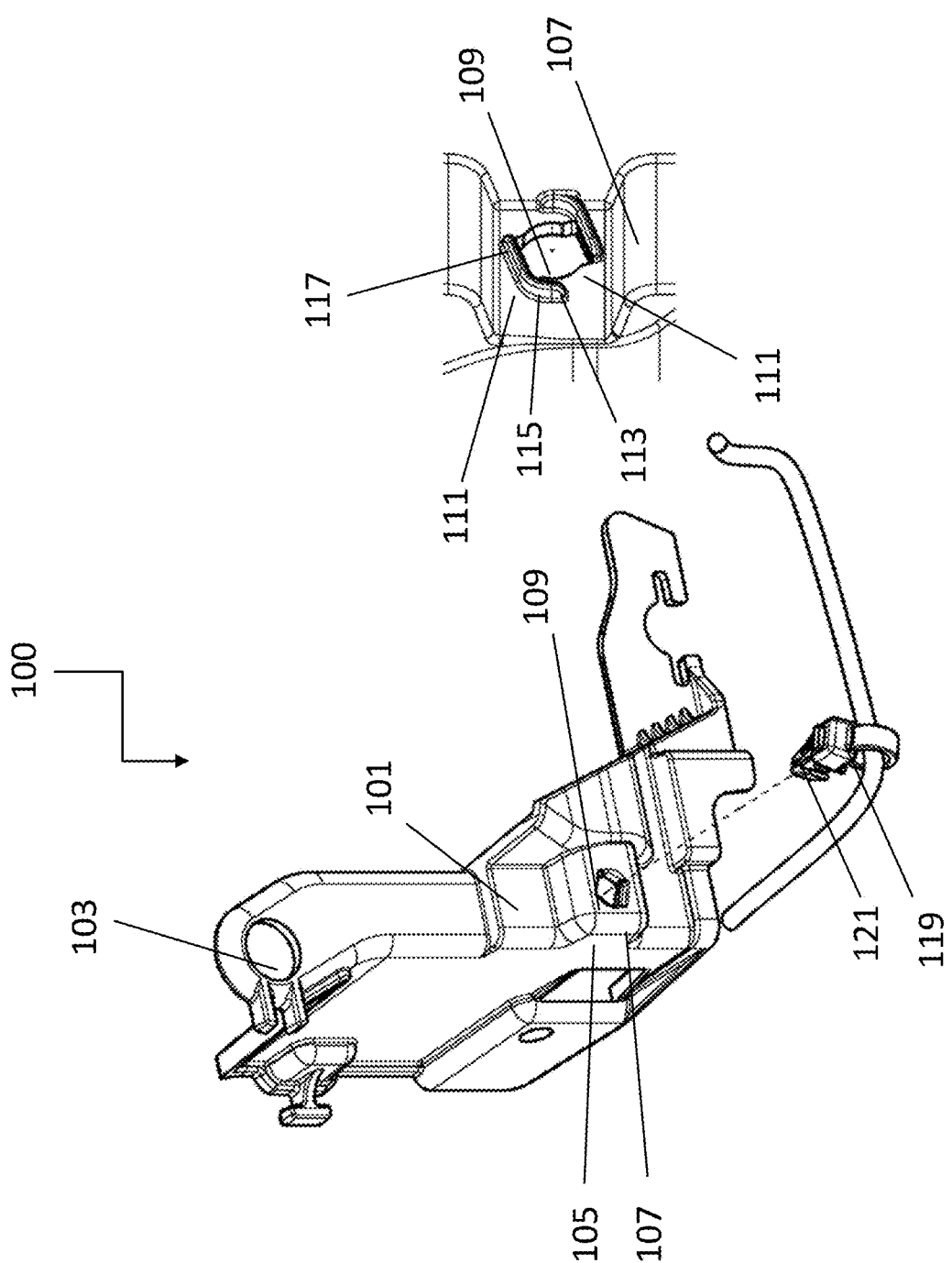
FIG. 1 shows a possible embodiment of the housing module disclosed herein.

In FIG. 1, a housing module 100 is shown. The housing module 100 comprises a base body 101, a mounting interface 103 provided on the base body 101 for mounting the housing module 100 to a lighting element, and a receptacle 105 provided on the base body 101 for arranging a cable holder 119.

The receptacle 105 is shown in a front view and a detailed rear view, and includes an opening 109 formed in a surface 107 and a number of sliding elements 111 surrounding the opening 109 in portions thereof. For example, two surrounding sliding elements 111 are provided here. The sliding elements 111 may have the same shape, but may also have different shapes. Preferably, the two sliding elements 111 are arranged on two opposite sides, in particular mirrored to each other about an axis through the center of the opening 109, at the opening 109.

Figure 2:
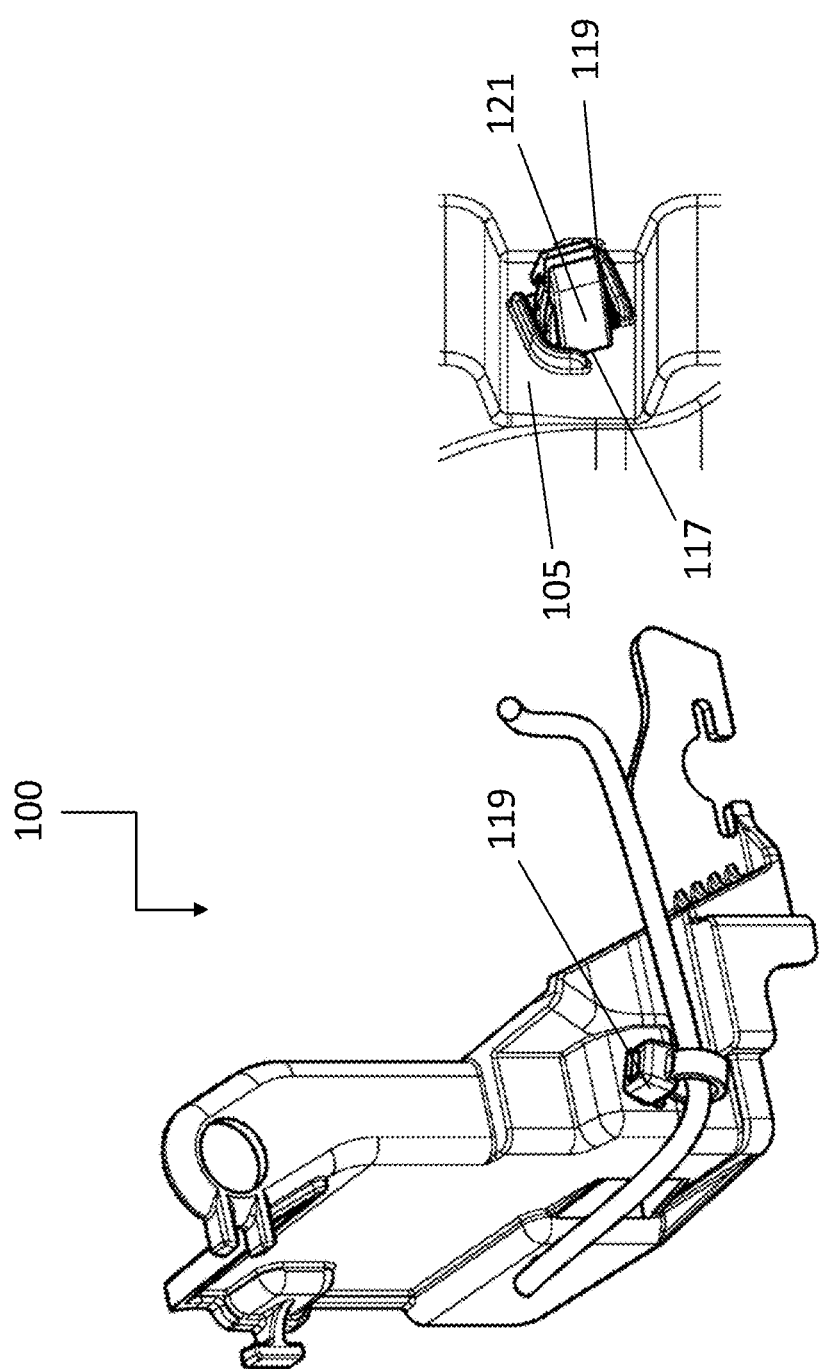
FIG. 2 shows the housing module according to FIG. 1 with a cable holder in its locked position.

The sliding elements 111 are configured to urge a number of resilient latching elements 121 of the cable holder 119, which protrude through the surface 107, from a locking position to a release position when the cable holder 119 rotates in the opening 109. For this purpose, in the present case, the sliding elements 111 are arranged on an upper side and a lower side of the opening 109 so that lateral contact surfaces 113 are exposed for engagement by the latching elements of the cable holder 119. Accordingly, the latching elements 121 of the cable holder 119 can engage the contact surfaces 113 and secure the cable holder against sliding out of the opening 109, as shown in FIG. 2.

The opening 109 extends straight at the top and bottom, i.e., facing the sliding elements 111, so that a straight latching element 121 can slide through the opening 109.

The opening 109 extends laterally, i.e., facing away from the sliding elements 111, in a bulbous or arcuate manner so as to provide a space for movement into which the cable holder 119 can expand when the cable holder 119 is in the locked position to move the latching elements into a position in which they overlie the surface 107, in particular the contact surfaces 113.

The tapering of the opening 109 in its width at its upper and lower sides additionally urges the cable tie into its release position when the latter moves out of its locked position.

The sliding elements 111 each comprise a curved portion 115 and a straight portion 117, the curved portion 115 being particularly quadrant-shaped so that a rotation of the cable tie by a quadrant or by about 90° moves the cable tie from the locked position to the release position or vice versa.

Furthermore, the ends of the sliding elements 111 each form a stop for the latching elements 121 of the cable holder 119, so that the cable holder can only rotate to a respective maximum position. Accordingly, the cable holder can be moved to the locked position or the release position by blind operation by turning it as far as it will go.

In FIG. 2, the cable holder 119 is shown in its locked position. Accordingly, the stretched or uncompressed latching elements 121 engage the contact surface 117 of the receptacle 105.

Figure 3:
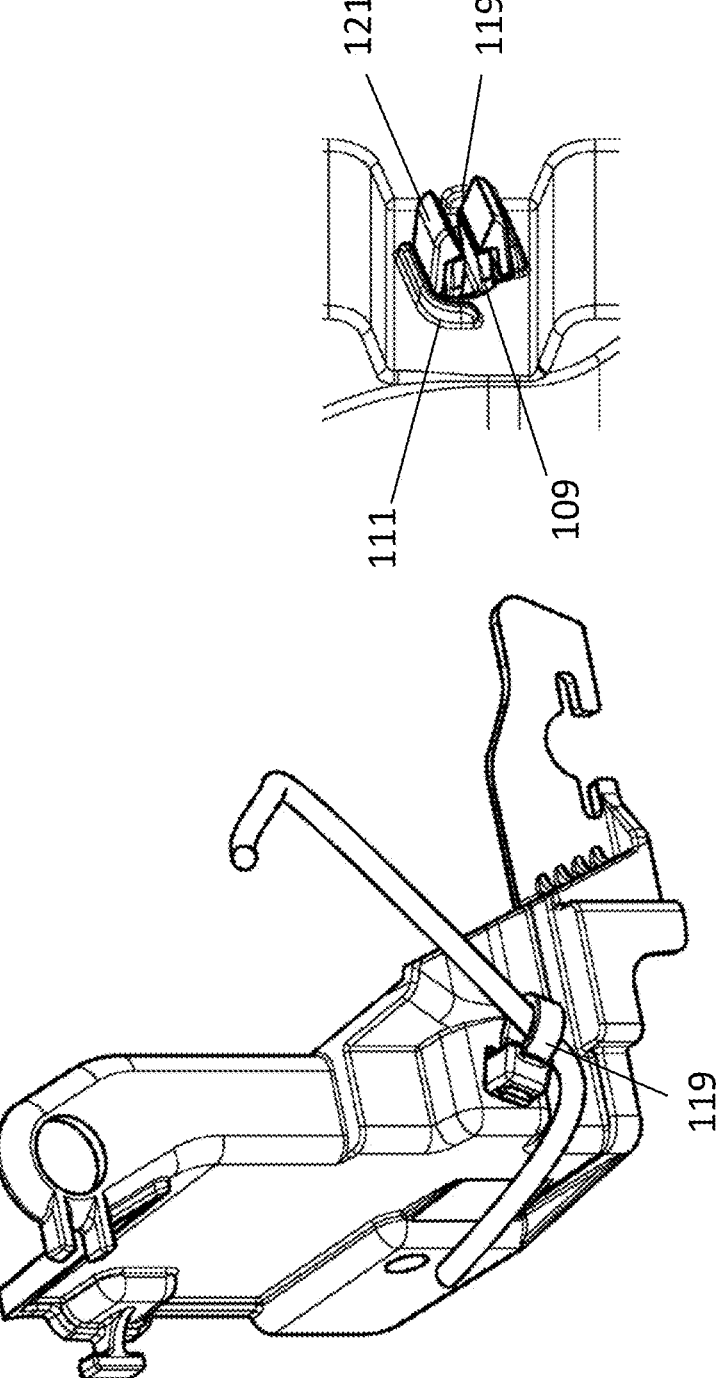
FIG. 3 shows the housing module according to FIG. 1 with a cable holder in its release position.

In FIG. 3, the cable holder 119 is shown in its release position. Accordingly, the latching elements 121 are compressed by the sliding elements 111 and can be passed through the opening 109, allowing the cable holder 119 to be released from the housing module 100.

Figure 4:
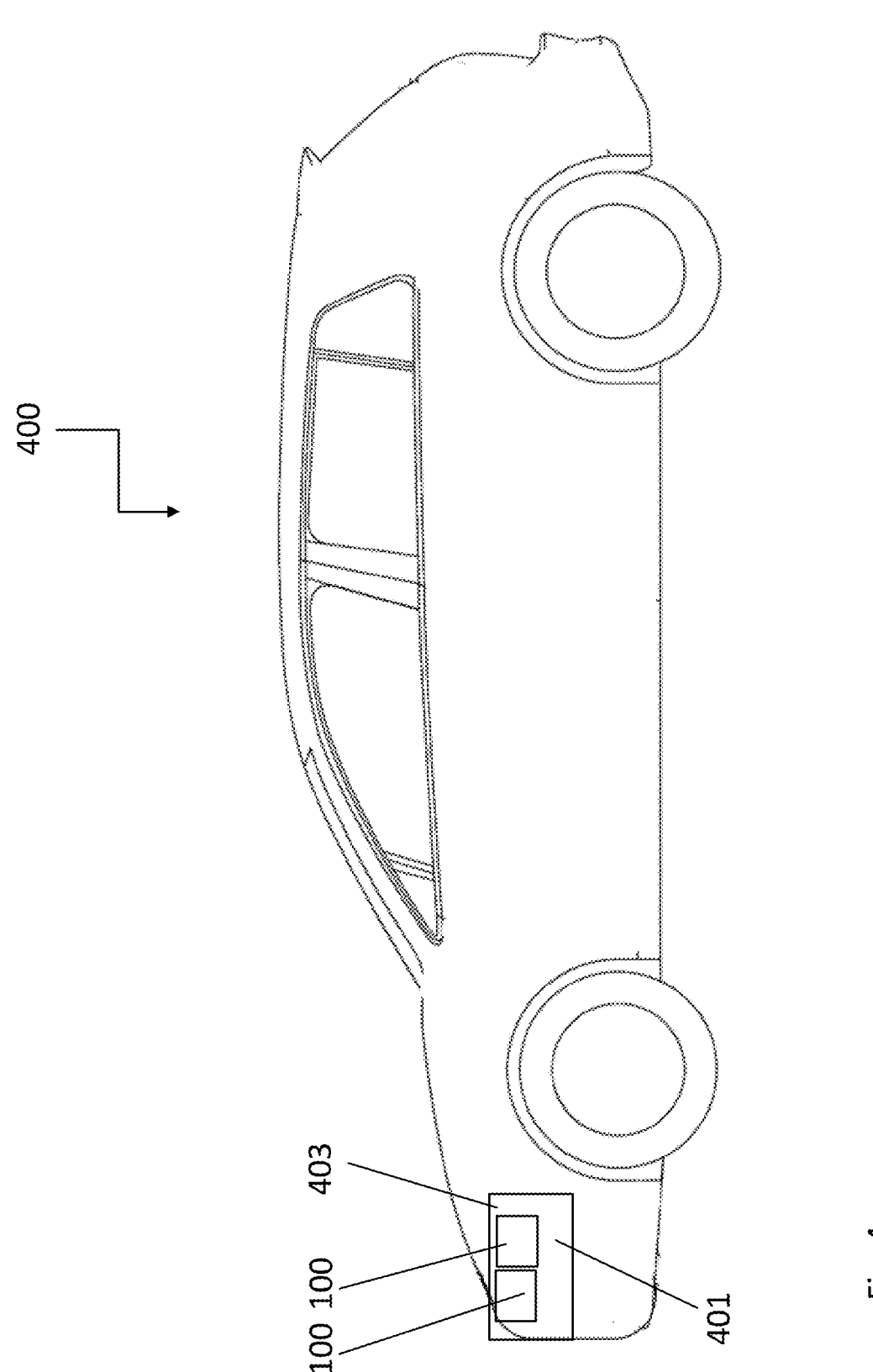
FIG. 4 shows a possible embodiment of the vehicle disclosed herein with a possible embodiment of the lighting element.

In FIG. 4, a vehicle 400 is illustrated. The vehicle 400 includes a lighting element 401 in the form of a headlight.

The lighting element 401 comprises a plurality of housing modules 100, as shown in FIG. 1, each of which is connected to a base body 403 of the lighting element 401 and/or to each other.

By detaching a housing module 100 from the base body 403 and/or respective other housing modules 100, an interior space of the lighting element 401 becomes accessible to a user so that, for example, a light source located in the interior space can be replaced.

Figure 5:
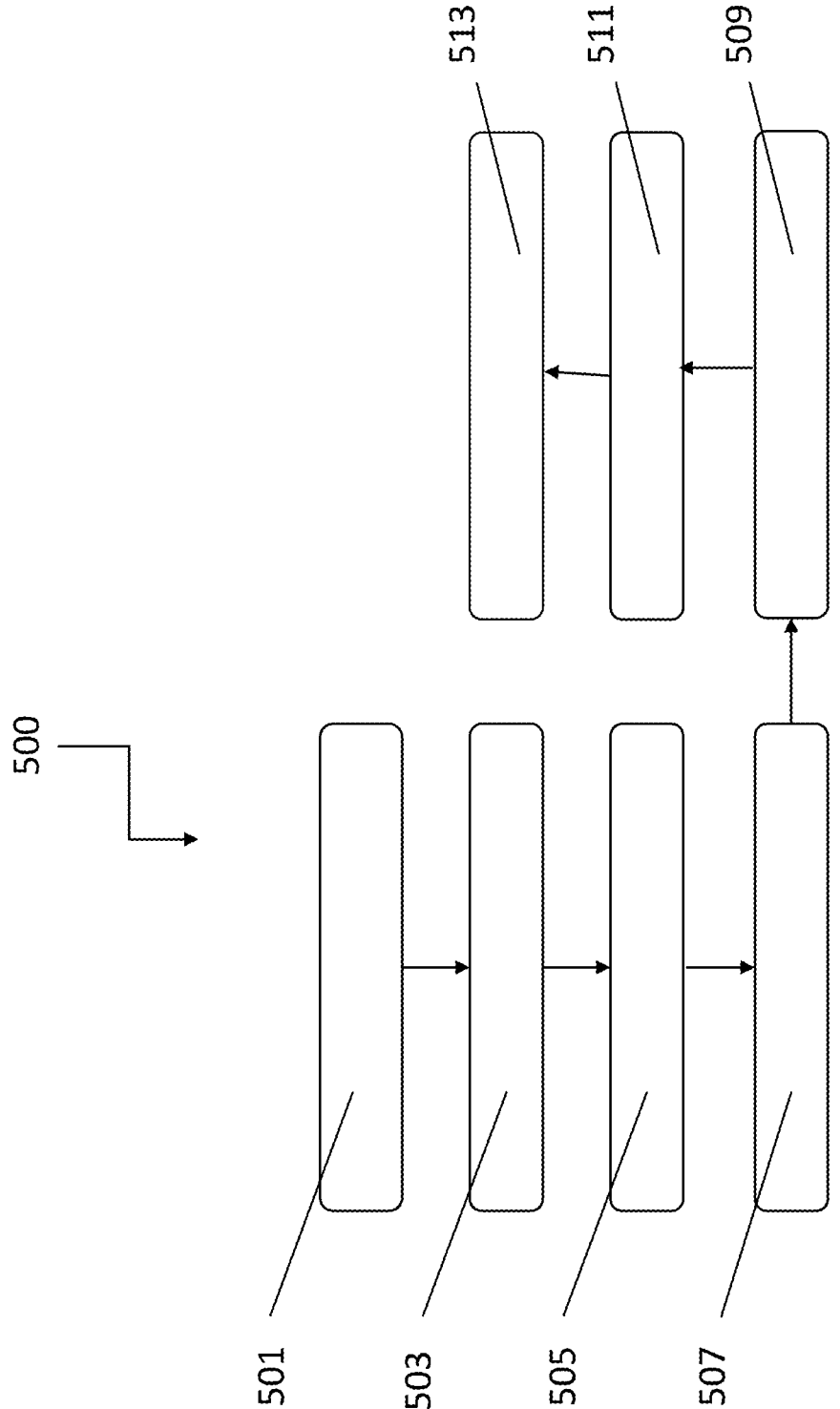
FIG. 5 shows a possible embodiment of the method disclosed herein.

FIG. 5 illustrates a method 500 for arranging a component at a mounting location of a lighting element.

Method 500 includes a rotating step 501 of rotating a cable holder of a housing module from a locking position to a release position, a first releasing step 503 of releasing the cable holder from the housing module, and a second releasing step 505 of releasing the housing module from the lighting element to gain access to the installation location.

Further, method 500 comprises a first arranging step 507 of arranging the component at the installation location, a second arranging step 509 of arranging the housing module at the lighting element and over the installation location, a connecting step 511, wherein the cable holder is connected to the housing module in the cable holder release position by inserting the cable holder into an opening of the housing module, and a rotating step 513 wherein the cable holder is rotated from the release position to the locking position to lock the cable holder to the housing module.

LIST OF REFERENCE NUMERALS

100 Housing module
101 Base body

103 Mounting interface
105 Receptacle
107 Surface
109 Opening
111 Sliding element
113 Contact surface
115 Curved part
117 Straight part
119 Cable holder
121 Latching element
400 Vehicle
401 Lighting element
403 Base body
500 Method
501 Rotation step
503 First release step
505 Second release step
507 First arranging step
509 Second arranging step
511 Connection step
513 Rotation step The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A housing module for a lighting element for a vehicle, wherein the housing module comprises:
   a base body;
   a fastening interface provided on the base body for fastening the housing module to a lighting element;
   a receptacle provided on the base body for arranging a cable holder, wherein the receptacle comprises an opening and a plurality of sliding elements partially surrounding the opening,
   wherein the plurality of sliding elements are arranged on and protrude from a first side of a surface of the base body comprising the opening, wherein the plurality of sliding elements are configured to urge a plurality of flexible latching elements of the cable holder projecting from a second side opposite the first side through the surface onto the first side from a locking position to a release position when the cable holder rotates in the opening,
   wherein the plurality of latching elements overlie the surface by an undercut and thereby conditionally secure the cable holder to the housing module in the locking position, and the plurality of latching elements are compressed so as to be movable through the opening to release the cable holder from the housing module in the release position,
   wherein each of the plurality of sliding elements are spaced apart from each other about a periphery of the opening, and wherein the opening between respective ones of the plurality of sliding elements defines a plurality of contact surfaces on the first side of the surface of the base body, such that the plurality of latching elements engage the plurality of contact surfaces when the cable holder is in the locking position to prevent withdrawal of the cable holder from the opening, and wherein the plurality of sliding elements urge the plurality of latching elements radially inward during rotation of the cable holder into the release position.

2. The housing module of claim 1, wherein the plurality of sliding elements continuously surround the opening with the exception of the contact surfaces formed between the respective sliding elements.

3. The housing module of claim 1, wherein respective sliding elements of the plurality of sliding elements are arranged opposite of the opening from each other in order to jointly and simultaneously urge respective latching elements of the plurality of latching elements into the release position when the cable holder is rotated in the opening.

4. The housing module of claim 1, wherein respective sliding elements of the plurality of sliding elements form an edge surface of portions of the opening.

5. The housing module of claim 1, wherein a space for movement is formed on the second side, in which the cable holder is rotatable between the locking position and the release position.

6. A lighting element comprising a plurality of housing modules according to claim 1 and further comprising a plurality of cable holders arranged in the opening of the base body of a respective housing module.

7. A vehicle comprising a plurality of lighting elements according to claim 6.

8. A housing module for a lighting element for a vehicle, wherein the housing module comprises:

a base body;

a fastening interface provided on the base body for fastening the housing module to a lighting element;

a receptacle provided on the base body for arranging a cable holder, wherein the receptacle comprises an opening and a plurality of sliding elements partially surrounding the opening, wherein the plurality of sliding elements are arranged on a first side of a surface of the base body comprising the opening, wherein the plurality of sliding elements are configured to urge a plurality of flexible latching elements of the cable holder projecting from a second side opposite the first side through the surface onto the first side from a locking position to a release position when the cable holder rotates in the opening, wherein the plurality of latching elements overlie the surface by an undercut and thereby conditionally secure the cable holder to the housing module in the locking position, and the plurality of latching elements are compressed so as to be movable through the opening to release the cable holder from the housing module in the release position, and wherein respective sliding elements of the plurality of sliding elements are bent towards each other in order to urge respective latching elements of the plurality of latching elements on a trajectory predetermined by the plurality of sliding elements from the locking position to the release position when the cable holder is rotated.

* * * * *